(12) United States Patent
Kanamori

(10) Patent No.: US 9,194,104 B2
(45) Date of Patent: Nov. 24, 2015

(54) WHEEL LOADER

(71) Applicant: KOMATSU LTD., Tokyo (JP)

(72) Inventor: Shirou Kanamori, Nonoichi (JP)

(73) Assignee: KOMATSU LTD., Tokyo (JP)

( * ) Notice: Subject to any disclaimer, the term of this patent is extended or adjusted under 35 U.S.C. 154(b) by 180 days.

(21) Appl. No.: 14/112,983

(22) PCT Filed: Mar. 26, 2013

(86) PCT No.: PCT/JP2013/058707
§ 371 (c)(1),
(2) Date: Oct. 21, 2013

(87) PCT Pub. No.: WO2014/155506
PCT Pub. Date: Oct. 2, 2014

(65) Prior Publication Data
US 2015/0204050 A1    Jul. 23, 2015

(51) Int. Cl.
*B60K 13/04*    (2006.01)
*E02F 9/08*    (2006.01)
*F01N 13/18*    (2010.01)
*B60R 3/00*    (2006.01)
(Continued)

(52) U.S. Cl.
CPC .............. *E02F 9/0883* (2013.01); *B60R 3/00* (2013.01); *E02F 3/3411* (2013.01); *E02F 9/0833* (2013.01); *E02F 9/0866* (2013.01); *E02F 9/16* (2013.01); *F01N 3/021* (2013.01); *F01N 3/0814* (2013.01); *F01N 3/2066* (2013.01); *F01N 13/1822* (2013.01); *F01N 2590/08* (2013.01); *F01N 2610/1406* (2013.01)

(58) Field of Classification Search
CPC ....... B60K 13/04; B60K 15/063; Y02T 10/24
USPC ........................................... 180/301
See application file for complete search history.

(56) References Cited

U.S. PATENT DOCUMENTS 4,131,172 A * 12/1978 Wolfgram .................. 180/69.24
2010/0031644 A1    2/2010 Keane et al.
(Continued)

FOREIGN PATENT DOCUMENTS

EP    2 243 651 A1    10/2010
EP    2 479 393 A1    7/2012
(Continued)

OTHER PUBLICATIONS

International Search Report for PCT/JP2013/058707, issued on May 21, 2013.
(Continued)

*Primary Examiner* — Hau Phan
*Assistant Examiner* — Bryan Evans
(74) *Attorney, Agent, or Firm* — Global IP Counselors, LLP

(57) ABSTRACT

A wheel loader includes an engine, a selective catalyst reduction device, a cab, a ladder, a reducing agent tank, and an injection device. The selective catalyst reduction device is configured to treat exhaust gas from the engine. The cab is provided with a driver seat therein. The ladder is configured for ascending to and descending from the cab and provided on a lateral side of the cab. The reducing agent tank is disposed behind the ladder and adapted to store a reducing agent. The injection device is configured to inject the reducing agent from the reducing agent tank into exhaust gas fed from the engine toward the selective catalyst reduction device.

13 Claims, 14 Drawing Sheets

(51) Int. Cl.
  *E02F 3/34* (2006.01)
  *F01N 3/08* (2006.01)
  *E02F 9/16* (2006.01)
  *F01N 3/021* (2006.01)
  *F01N 3/20* (2006.01)

(56) References Cited

U.S. PATENT DOCUMENTS

2010/0178215 A1   7/2010   Honda et al.
2010/0212297 A1*  8/2010   Kamiya et al. ................. 60/286
2010/0293928 A1* 11/2010   Kamiya et al. ................. 60/295

FOREIGN PATENT DOCUMENTS

| JP | 2008-240676 A | 10/2008 |
| JP | 2008-274579 A | 11/2008 |
| JP | 2009-85064 A  | 4/2009  |
| JP | 2010-84322 A  | 4/2010  |
| JP | 2011-131730 A | 7/2011  |
| JP | 2012-219624 A | 11/2012 |
| JP | 2012-237232 A | 12/2012 |
| JP | 2013-2082 A   | 1/2013  |
| WO | 2011027765 A1 | 3/2011  |

OTHER PUBLICATIONS

The extended European search report for the corresponding European application No. No. 13750619.2, issued on Jan. 16, 2015.

The Japanese Office Action for a corresponding Japanese application No. 2013-521325, issued on Apr. 30, 2014.

The Office Action for the corresponding Japanese application No. 2013-521325, issued on Jul. 29, 2014.

\* cited by examiner

WHEEL LOADER

CROSS-REFERENCE TO RELATED APPLICATIONS

This application is a U.S. National stage application of International Application No. PCT/JP2013/058707, filed on Mar. 26, 2013.

BACKGROUND

1. Field of the Invention

The present invention relates to a wheel loader.

2. Background Information

Generally a diesel engine is used as the engine for a wheel loader. The diesel engine produces nitrogen oxide since the inside of the combustion chamber has an excessive amount of nitrogen, and thus the exhaust gas includes nitrogen oxides. A hydraulic excavator, for example, described in Japanese Patent Laid-open No. 2012-237232 includes a selective catalyst reduction device, an injection device, and a reducing agent tank for removing the nitrogen oxides in the exhaust gas. The reducing agent tank contains a reducing agent such as a urea aqueous solution, and the injection device injects the reducing agent into the exhaust gas upstream from the selective catalyst reduction device. As a result, the nitrogen oxides in the exhaust gas exhausted from the engine are reduced to nitrogen.

SUMMARY

In order to remove the nitrogen oxides included in the exhaust gas in a wheel loader, a selective catalyst reduction device may be mounted on the wheel loader in the same way as the abovementioned hydraulic excavator. As a result, the wheel loader requires the provision of a reducing agent tank for storing the reducing agent. Since the reducing agent inside the reducing agent tank decreases accompanying the use thereof, the reducing agent tank needs to be replenished with the reducing agent as appropriate, and a problem of a loss of convenience arises if the reducing agent tank is disposed in a location that is difficult to access from the ground.

An object of the present invention is to dispose a reducing agent tank in a location that allows for easy access from the ground.

(1) A wheel loader according to an aspect of the present invention comprises an engine, a selective catalyst reduction device, a cab, a ladder, a reducing agent tank, and an injection device. The selective catalyst reduction device treats exhaust gas from the engine. The cab is provided with a driver seat therein. The ladder is provided on a lateral side of the cab and is used when ascending to or descending from the cab. The reducing agent tank is disposed behind the ladder and stores the reducing agent. The injection device injects the reducing agent from the reducing agent tank into the exhaust gas fed from the engine toward the selective catalyst reduction device.

According to the above configuration, since the reducing agent tank is disposed behind the ladder, an operator is able to easily access the reducing agent tank from the ground. Further, the wheel loader includes a front vehicle section and a rear vehicle section that are connected to each other in the horizontal direction in a manner that allows swinging, and front wheels provided on the front vehicle section are disposed in front the ladder that is a portion of the rear vehicle section. As a result, a work space is formed between the ladder and the front wheel by swinging the front vehicle section, with respect to the rear vehicle section, to the side opposite the side on which the reducing agent tank is disposed. As a result, work such as replenishing the reducing agent in the reducing agent tank disposed behind the ladder can be carried out easily.

(2) The injection device is preferably disposed on a first lateral side as seen from the rear, and the reducing agent tank is disposed behind the ladder provided on the first lateral side of the cab.

According to this configuration, the length of a reducing agent pipe connecting the injection device and the reducing agent tank can be reduced since the injection device and the reducing agent tank are disposed on the same side of the wheel loader.

(3) The wheel loader preferably further includes a diesel particulate filtering device and a connecting pipe. The connecting pipe connects the diesel particulate filtering device and the selective catalyst reduction device. The diesel particulate filtering device, the selective catalyst reduction device, and the connecting pipe are disposed with the longitudinal directions thereof aligned in the vehicle width direction.

According to this configuration, particulate matter in soot and the like included in the exhaust gas from the engine can be collected by the diesel particulate filtering device.

(4) The diesel particulate filtering device preferably has an exhaust gas inlet and an exhaust gas outlet. The exhaust gas inlet introduces the exhaust gas from the engine. The exhaust gas outlet delivers the exhaust gas the toward the selective catalyst reduction device. The exhaust gas inlet is located on a second lateral side, and the exhaust gas outlet is located on the first lateral side.

According to this configuration, the exhaust gas outlet of the diesel particulate filtering device and the injection device are both located on the first lateral side. As a result, the injection device is able to mix the reducing agent into the exhaust gas by effectively using the length of the connecting pipe.

(5) The wheel loader preferably further includes a turbo charger disposed on the second lateral side.

According to this configuration, the length of a pipe connecting the turbo charger and the diesel particulate filtering device can be reduced since the turbo charger is located on the second lateral side where the exhaust gas inlet of the diesel particulate filtering device is located.

(6) The reducing agent tank preferably has a replenishment inlet for replenishing the reducing agent, and the replenishment inlet is provided facing the front.

According to this configuration, work on the reducing agent tank such as replenishing the reducing agent in the reducing agent tank can be carried out by using the space between the ladder and the front wheel since the replenishment inlet faces the front.

(7) The wheel loader preferably further includes a retaining member and a supporting frame. The retaining member retains the reducing agent tank. The supporting frame supports the retaining member in a manner that allows sliding to the front, and is disposed behind the ladder.

According to this configuration, the reducing agent tank may be easily pulled out toward the front since the retaining member that retains the reducing agent tank is supported by the supporting frame in a manner that allows sliding to the front.

(8) The retaining member preferably has a bottom plate, a back plate that extends upward from the rear edge of the bottom plate, and a pair of side plates that extend upward from both side edges of the bottom plate. The reducing agent tank is accommodated in a space defined by the bottom plate, the back plate, and the pair of side plates.

According to this configuration, the retaining member is able to retain the reducing agent tank in a stable manner since the side and back surfaces of the reducing agent tank are supported by the back plate and the side plates of the retaining member.

(9) The retaining member preferably has a regulating member that regulates movement of the reducing agent tank upward or forward.

According to this configuration, the reducing agent tank accidentally jumping upward or forward from the retaining member can be prevented by the regulating member.

(10) The reducing agent is preferably a urea aqueous solution. When the urea aqueous solution is injected into the exhaust gas under high temperatures, the urea aqueous solution is hydrolyzed to obtain ammonia. The ammonia is chemically reacted with a nitrogen oxide which is reduced to nitrogen and water.

According to the present invention, a reducing agent tank is disposed in a location that allows for easy access from the ground.

DETAILED DESCRIPTION OF EMBODIMENTS

Figure 1:
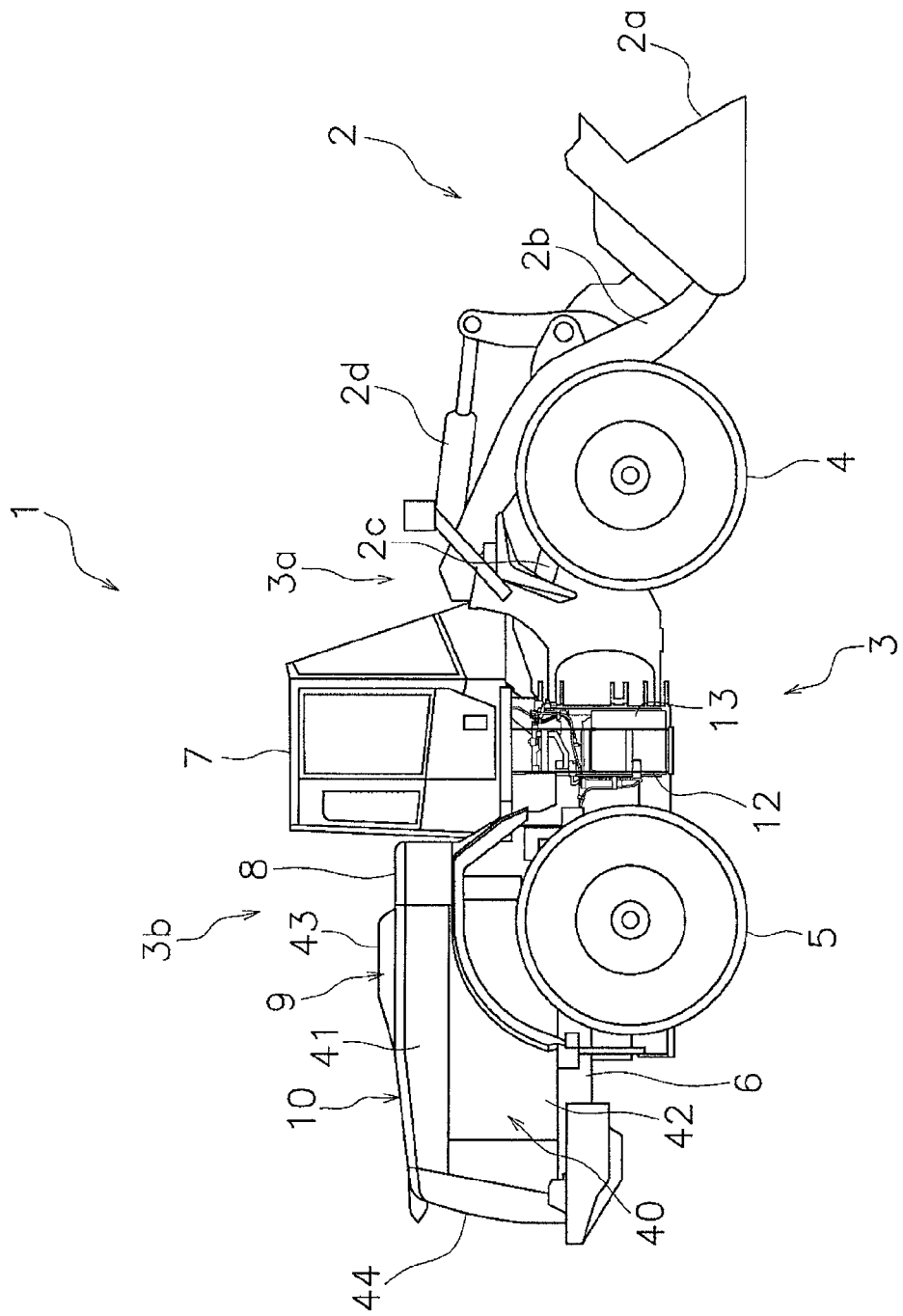
FIG. 1 is a right side view of a wheel loader.

An embodiment of a wheel loader according to the present invention will be explained below with reference to the drawings. FIG. 1 is a right side view of a wheel loader. In the following explanation, "front" and "rear" refer to the front and the rear of a vehicle body 3. That is, the right side is the "front" and the left side is the "rear" in FIG. 1. In the following explanation, "right" "left," "up," and "down" indicate directions relative to a state of looking forward from the operating cabin, and "vehicle width direction" and "crosswise direction" have the same meaning. Further, "width" signifies a length in the crosswise direction.

As illustrated in FIG. 1, the wheel loader 1 includes work implement 2, the vehicle body 3, front wheels 4, and rear wheels 5. The wheel loader 1 is capable of traveling due to the rotation of the front wheels 4 and the rear wheels 5, and desired work can be conducted using the work implement 2.

The work implement 2 is a mechanism driven by operating fluid pressurized by a hydraulic pump (not illustrated), and is disposed at the front of the vehicle body 3. The work implement 2 includes a bucket 2a, booms 2b, lift cylinders 2c, and a bucket cylinder 2d. The bucket 2a is attached to the tip of the booms 2b. The booms 2b are members for lifting the bucket 2a and are mounted at the front part of a belowmentioned front vehicle section 3a. The lift cylinders 2c drive the booms 2b with pressure oil discharged from the hydraulic pump. The bucket cylinder 2d drives the bucket 2a with pressure oil discharged from the hydraulic pump.

The vehicle body 3 includes the front vehicle section 3a and a rear vehicle section 3b. The front vehicle section 3a and the rear vehicle section 3b are coupled to each other in a manner that allows swinging in the crosswise direction. The work implement 2 and the front wheels 4 are provided on the front vehicle section 3a, and the rear wheels 5 are provided on the rear vehicle section 3b. When the front vehicle section 3a swings with respect to the rear vehicle section 3b so that the front vehicle section 3a faces the left side, a large space is formed in front of a belowmentioned urea aqueous solution tank 13.

The rear vehicle section 3b includes a rear frame 6, a cab 7, an operating fluid tank 8, an engine room 9, a cooling room 10, and a cooling fan 11. The rear frame 6 constitutes the entire shape of the rear vehicle section 3b, and supports the rear wheels 5, the cab 7, the operating fluid tank 8, an engine 18, and a cooling unit 19.

An operating cabin is provided inside the cab 7, and various operating members and an operating panel are provided inside the cab 7. The operating fluid tank 8 is disposed to the rear of the cab 7, and a plurality of hydraulic pumps (not shown) are disposed below the operating fluid tank 8. Operating fluid for driving the work implement 2 and the like is stored in the operating fluid tank 8, and the operating fluid is supplied to the work implement 2 and the like by the hydraulic pumps.

A ladder 12 for ascending to and descending from the cab 7 is disposed on the right side (example of a first lateral side) of the cab 7. The ladder 12 is fixed to the rear frame 6 and extends from a lower edge part of the cab 7 to close to the ground. Since the ladder 12 is provided a certain distance away from the rear frame 6, a space is formed between the ladder 12 and the rear frame 6, that is, behind the ladder 12.

Figure 2:
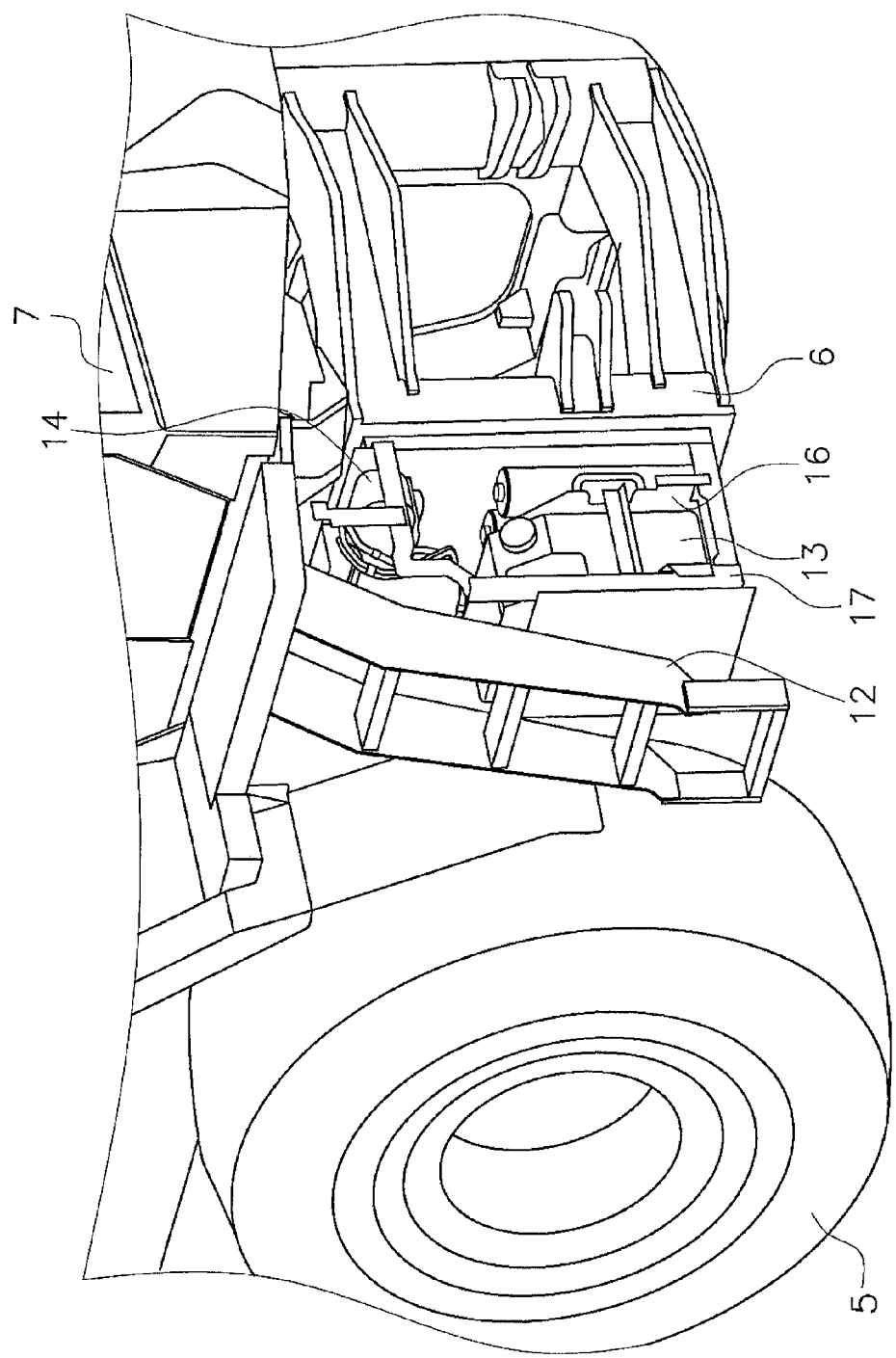
FIG. 2 is a perspective view around a urea aqueous solution tank as seen from the right front.
Figure 3:
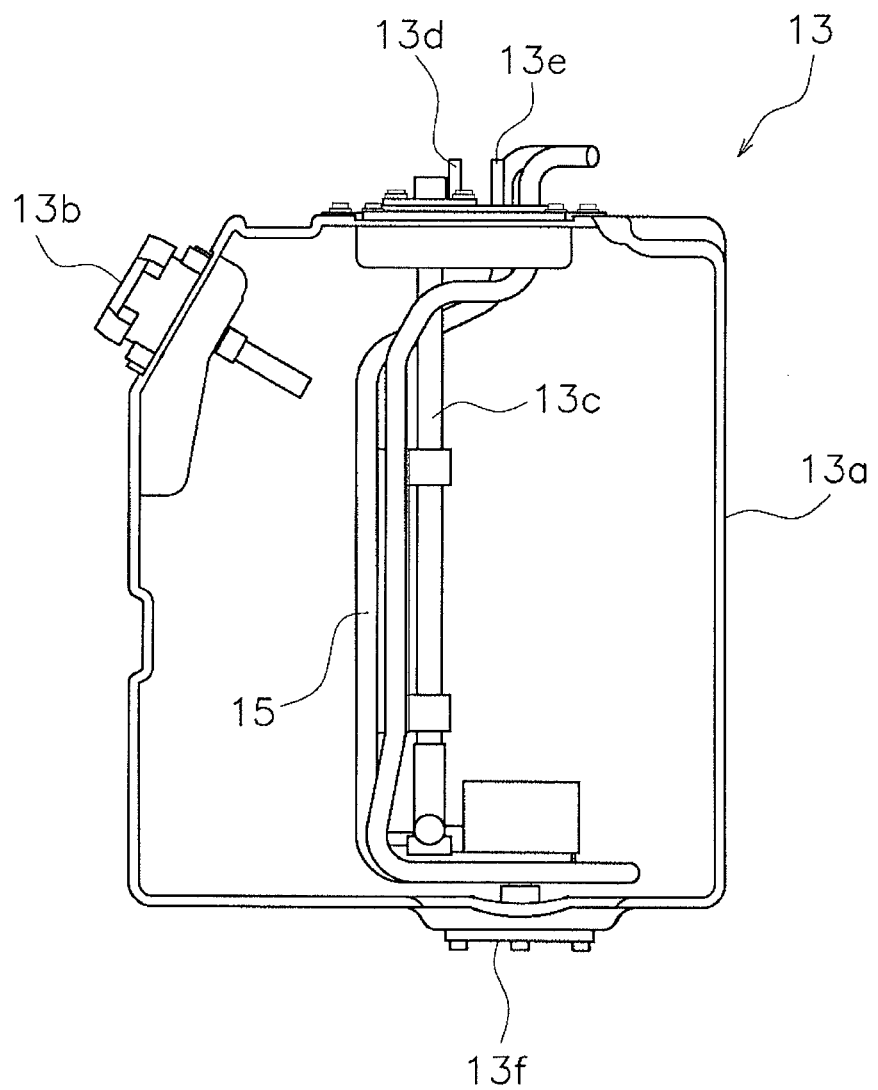
FIG. 3 is a side cross-section of the urea aqueous solution tank as seen from the left side.

FIG. 2 is a perspective view around the urea aqueous solution tank 13 as seen from the left front, and FIG. 3 is a side cross-section of the urea aqueous solution tank 13 as seen from the left side. As illustrated in FIG. 2, the urea aqueous solution tank (example of the reducing agent tank) 13 is disposed in the space formed behind the ladder 12. As illustrated in FIG. 3, the urea aqueous solution tank 13 includes a tank body 13a, a replenishment inlet 13b, a level gauge 13c, a first port 13d, and a second port 13e.

The tank body 13a has roughly a rectangular parallelepiped shape and a urea aqueous solution (example of the reducing agent) is stored therein. A projecting part 13f has a circular shape in a plan view, projects downward, and is formed on the bottom surface of the tank body 13a. The projecting part 13f is located further toward the rear than a middle portion in the front-back direction. The replenishment inlet 13b is provided on the top of the tank body 13a and the urea aqueous solution is poured into the tank body 13a from the replenishment inlet 13b. The replenishment inlet 13b faces the forward side in a state in which the urea aqueous solution tank 13 is provided behind the ladder 12.

The level gauge 13c extends from the top surface of the tank body 13a to the bottom surface thereof inside the tank body 13a, and measures a remaining amount of the urea aqueous solution inside the tank body 13a. The first and second ports 13d and 13e are formed on the top surface of the tank body 13a. The first and second ports 13d and 13e are each connected to a urea aqueous solution pump 14 via pipes. The urea aqueous solution pump 14 is disposed above the urea aqueous solution tank 13 behind the ladder 12 (see FIG. 2). The urea aqueous solution pump 14 discharges urea aqueous solution sucked in from the inside of the tank body 13a through the first port 13d to a belowmentioned injection device 24 through the urea aqueous solution pipe 25. The urea aqueous solution pump 14 returns an excess amount of the urea aqueous solution to the inside of the tank body 13a through the second port 13e.

A cooling water return pipe 15 extends inside the tank body 13a. The cooling water return pipe 15 is connected to the belowmentioned engine 18 and the cooling unit 19 so that cooling water is able to flow inside the tank body 13a. The cooling water absorbs heat from the engine 18 to become heated water. Freezing of the urea aqueous solution stored inside the tank body 13a can be prevented due to the cooling water return pipe 15 through which the heated water flows being provided inside the tank body 13a.

As illustrated in FIG. 2, the urea aqueous solution tank 13 is accommodated inside a supporting frame 17 in a state of being retained by a retaining member 16. The supporting frame 17 is fixed to the rear frame 6 in the space behind the ladder 12. The urea aqueous solution tank 13 is accommodated within the space of the supporting frame 17. The supporting frame 17 includes rail parts 17a (see FIG. 5) and a bottom plate 17b (see FIG. 5). Each rail part 17a is a member that allows the retaining member 16 to be pulled forward as described below, and includes a first sloping part 17c and a second sloping part 17d. The bottom plate 17b supports, from the bottom, the retaining member 16 that retains the urea aqueous solution tank 13.

Figure 4:
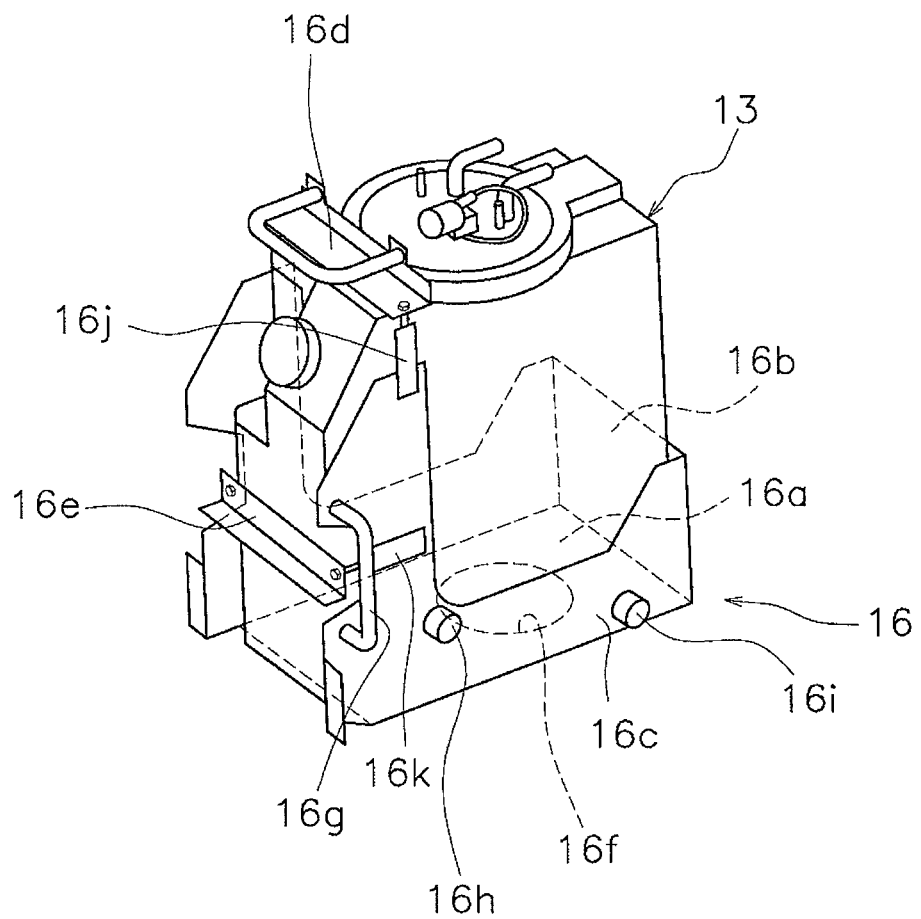
FIG. 4 is a perspective view of a retaining member while retaining the urea aqueous solution tank.

FIG. 4 is a perspective view of the retaining member 16 in a state of retaining the urea aqueous solution tank 13. The retaining member 16 is a member for retaining the urea aqueous solution tank 13. As illustrated in FIG. 4, the retaining member 16 has a bottom plate 16a, a back plate 16b, a pair of side plates 16c, a first regulating bar (example of regulating member) 16d, and a second regulating bar (example of regulating member) 16e.

The bottom plate 16a of the retaining member 16 has a rectangular shape and is formed with an opening part 16f. While the retaining member 16 is retaining the urea aqueous solution tank 13, the projecting part 13f of the urea aqueous solution tank 13 projects downward and penetrates the opening part 16f of the bottom plate 16a. The back plate 16b extends upward from the rear edge of the bottom plate 16a and the pair of side plates 16c extends upward from both side edges of the bottom plate 16a. The urea aqueous solution tank 13 is accommodated in a space defined by the bottom plate 16a, the back plate 16b, and the pair of side plates 16c.

The front part of each of the pair of side plates 16c retains the urea aqueous solution tank 13 from a lower part to an upper part. The middle part and the rear part of each of the pair of side plates 16c retain the lower part of the urea aqueous solution tank 13. Specifically, the front parts of the side plates 16c extend upward further than the middle and rear parts thereof. The rear parts of the side plates 16c extend further upward than the middle parts thereof, and have the same height as the back plate 16b. In this way, since the retaining member 16 does not retain the entire side surfaces of the urea aqueous solution tank 13 with the pair of side plates 16c and the middle parts of the side surfaces of the urea aqueous solution tank 16 are exposed, deformation of the retaining member 16 can be prevented even if the urea aqueous solution freezes and the urea aqueous solution tank 13 expands.

The side plates 16c of the retaining member 16 have a handle 16g for an operator to pull both the retaining member 16 and the urea aqueous solution tank 13 forward and to return the same to the original position. A front part of the side plates 16c has a first convex part 16h in the front part thereof and a second convex part 16i in the rear part thereof, and both the first convex part 16h and the second convex part 16i project sideways. The first convex part 16h is located higher than the second convex part 16i. The first and second convex parts 16h, 16i slide in the front-back direction on the rail part 17a of the supporting frame 17.

Mounting brackets 16j extend upward from the upper edges of the front parts of the pair of side plates 16c. The first regulating bar 16d is attached to the side plates 16c via the mounting brackets 16j. The first regulating bar 16d extends in the vehicle width direction and both edges thereof are attached to the mounting brackets 16j with bolts and nuts and the like. The first regulating bar 16d is located above the front part of the urea aqueous solution tank 13 and regulates movement of the urea aqueous solution tank 13 upward and consequently prevents the urea aqueous solution tank 13 from jumping upward from the retaining member 16 while the retaining member 16 is retaining the urea aqueous solution tank 13.

Mounting brackets 16k extend forward from the middle of the front parts of the pair of side plates 16c. The second regulating bar 16e is attached to the side plates 16c through the mounting brackets 16k. The second regulating bar 16e extends in the vehicle width direction and both edges thereof are attached to the mounting brackets 16k with bolts and nuts and the like. The second regulating bar 16e is located in front of the urea aqueous solution tank 13 and regulates forward movement of the urea aqueous solution tank 13 and consequently prevents the urea aqueous solution tank 13 from jumping forward from the retaining member 16 while the retaining member 16 is retaining the urea aqueous solution tank 13.

Figure 5:
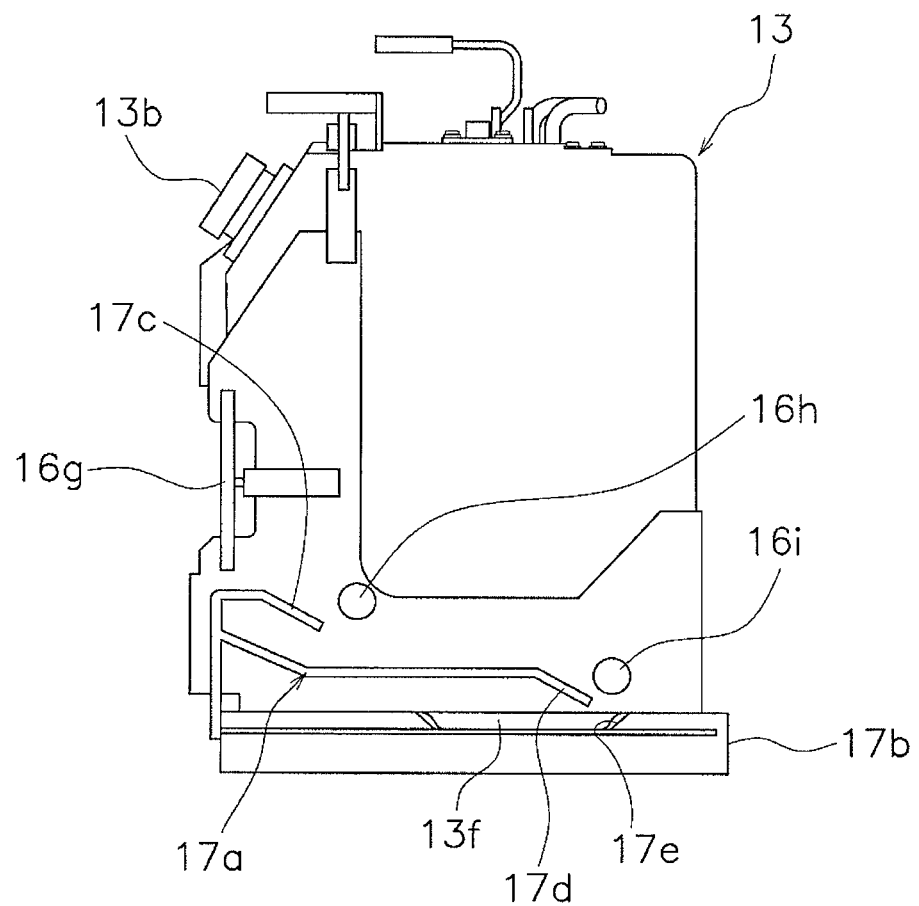
FIG. 5 is a left side view illustrating a state of the retaining member that retains the urea aqueous solution tank before sliding.
Figure 6:
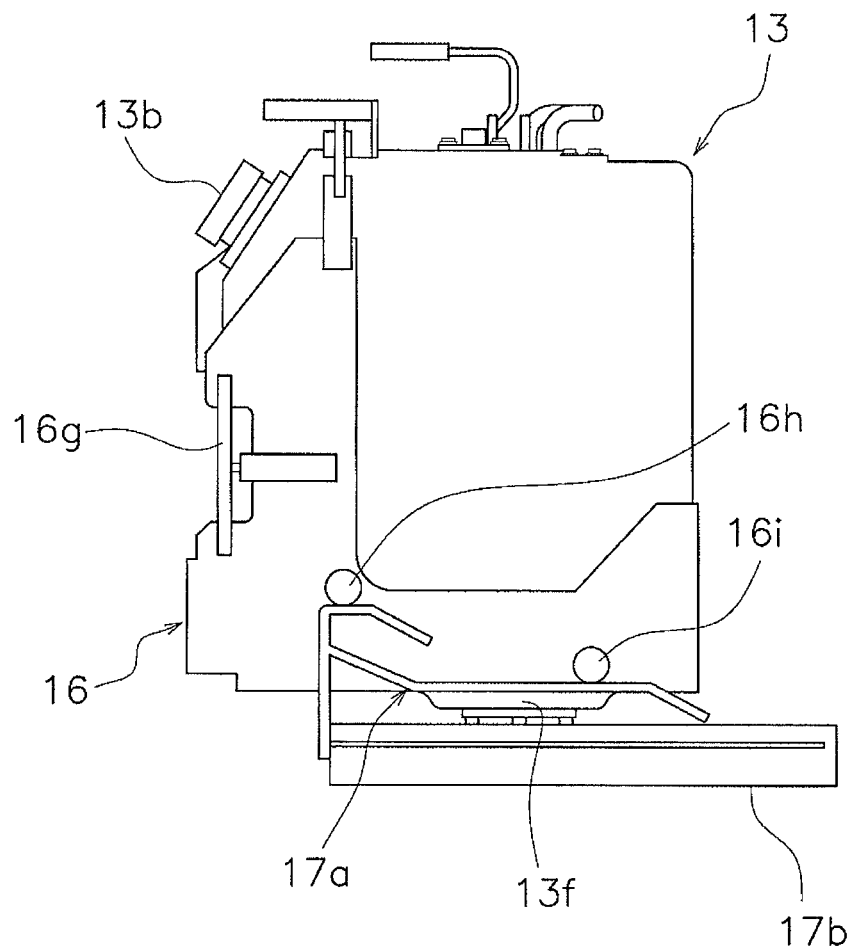
FIG. 6 is a left side view illustrating a state of the retaining member that retains the urea aqueous solution tank while sliding.
Figure 7:
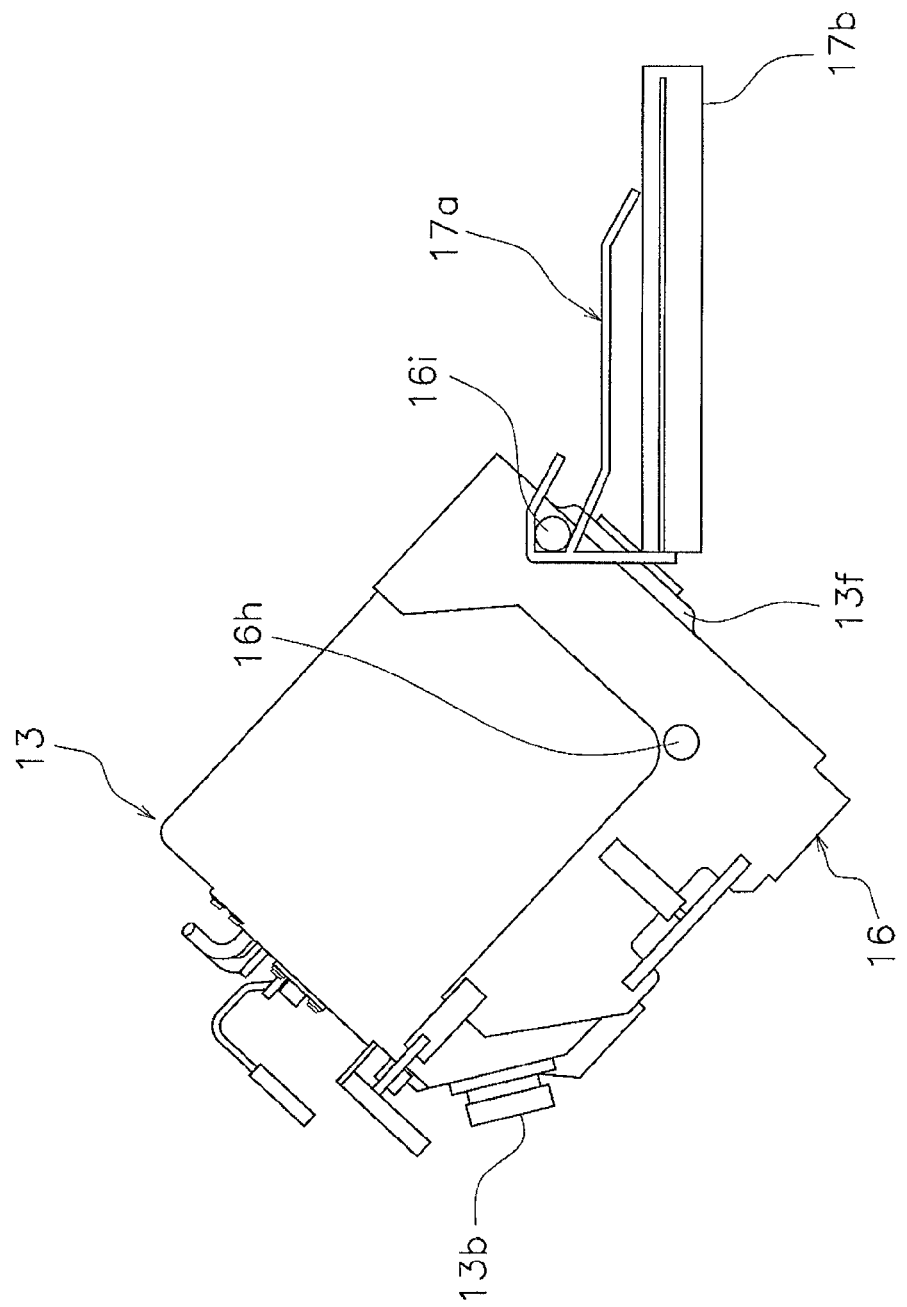
FIG. 7 is a left side view illustrating a state of the retaining member that retains the urea aqueous solution tank after sliding.

FIGS. 5 to 7 illustrate an appearance of the retaining member 16 that retains the urea aqueous solution tank 13 sliding forward. FIG. 5 illustrates a state of the retaining member 16 that retains the urea aqueous solution tank 13 before sliding, FIG. 6 illustrates a state of the retaining member 16 that retains the urea aqueous solution tank 13 while sliding, and FIG. 7 illustrates a state of the retaining member 16 that retains the urea aqueous solution tank 13 after sliding.

As illustrated in FIG. 5, in the state before sliding, the first convex part 16h of the side plates 16c of the retaining member 16 is located to the rear of the first sloping part 17c of the rail part 17a, and the second convex part 16i is located to the rear of the second sloping part 17d. In this state, the projecting part 13f of the urea aqueous solution tank 13 is engaged with a concave part 17e formed in the bottom plate 17b of the supporting frame 17.

From the state of FIG. 5, when the operator grabs the handle 16g and pulls the retaining member 16 forward, the first convex part 16h of the retaining member 16 slides along the first sloping part 17c of the rail part 17a and the second convex part 16*i* slides along the second sloping part 17*d*. As a result, the retaining member 16 slides forward and moves upward due to the portions of the first and second sloping parts 17*c*, 17*d*, and the projecting part 13*f* of the urea aqueous solution tank 13 slides out of the concave part 17*e* of the bottom plate 17*b* of the supporting frame 17. The retaining member 16 that retains the urea aqueous solution tank 13 then enters the state illustrated in FIG. 6.

From the state in FIG. 6, when the operator pulls the retaining member 16 further forward, the first and second convex parts 16*h*, 16*i* slide forward along the rail part 17*a*. When the projecting part 13*f* of the urea aqueous solution tank 13 reaches the front edge of the bottom plate 17*b* of the supporting frame 17, the urea aqueous solution tank 13 rotates, as if falling forward, around the contact point between the projecting part 13*f* of the urea aqueous solution tank 13 and the front edge of the bottom plate 17*b* as illustrated in FIG. 7. The second convex part 16*i* of the retaining member 16 engages with a front tip part of the U-shaped rail part 17*a* so that the rotation of the urea aqueous solution tank 13 is stopped in the state illustrated in FIG. 7. In this way, since the urea aqueous solution tank 13 is pulled forward from the supporting frame 17 so that the urea aqueous solution tank 13 is slanted forward, maintenance on the sensors such as the level gauge 13*c* disposed on the top surface of the urea aqueous solution tank 13 is facilitated. Further, the removal of the urea aqueous solution tank 13 from the retaining member 16 is also facilitated. The urea aqueous solution tank 13 can be taken out of the retaining member 16 after removing the first and second regulating bars 16*d*, 16*e*.

Figure 8:
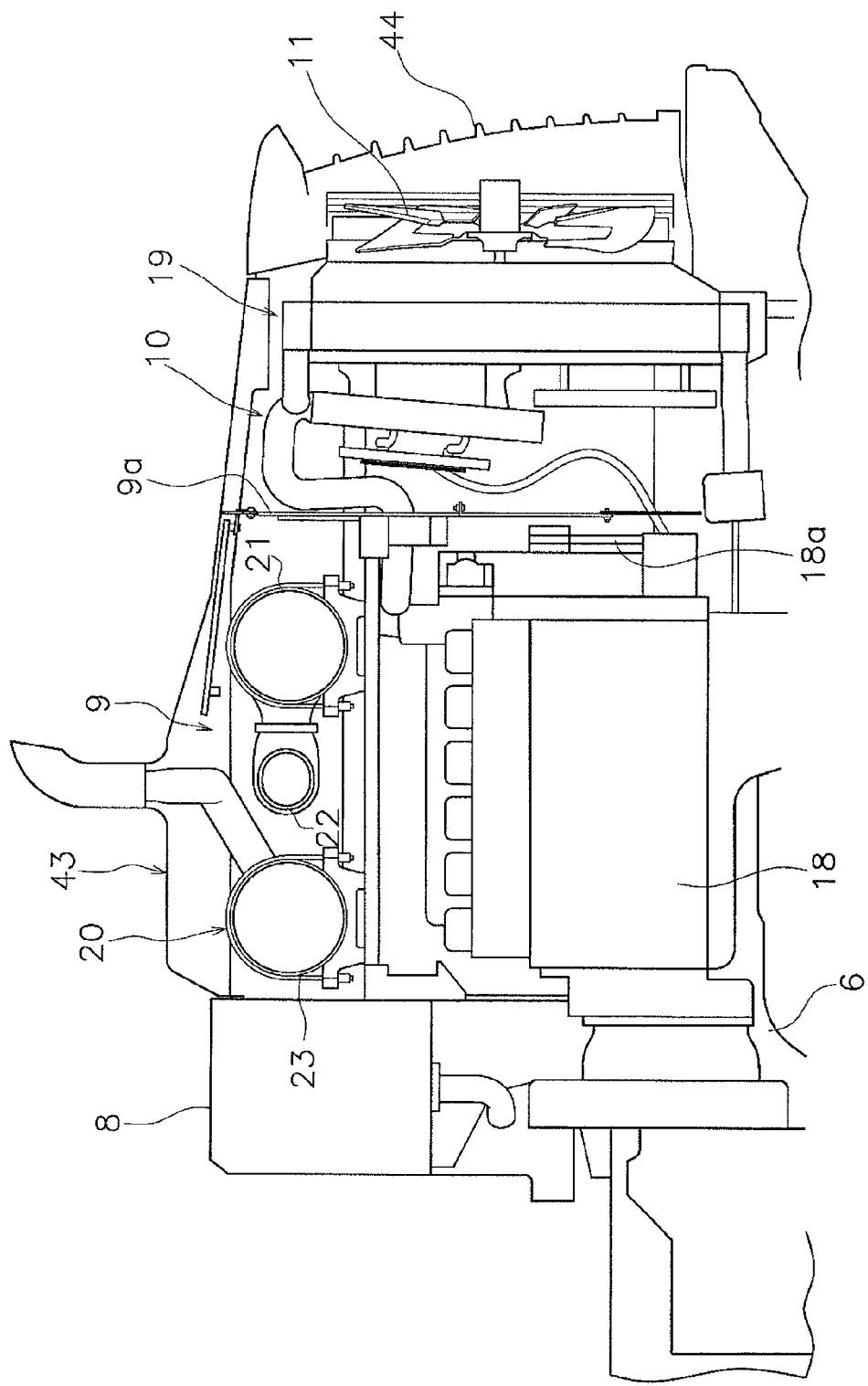
FIG. 8 is a side cross-section of the rear vehicle section as seen from the left side.

FIG. 8 is a side cross-section of the rear vehicle section 3*b* as seen from the left. As illustrated in FIG. 8, the engine room 9 is disposed behind the operating fluid tank 8. The side planes and the top plane of the engine room 9 are defined by a vehicle body cover 40 (see FIG. 1), and the rear plane thereof is defined by a partition wall 9*a*. The vehicle body cover 40 is attached to the rear frame 6. The vehicle body cover 40 is divided into a plurality of portions and each of the portions can be opened and closed independently in order to facilitate access to the inside parts (the engine room 9 and the cooling room 10) of the rear vehicle section 3*b*.

Specifically, the vehicle body cover 40 mainly has an upper cover 41, a lower cover 42, and a top plate 43 as illustrated in FIG. 1. The upper cover 41 is a member for covering an upper side surface part of the rear vehicle section 3*b*. The upper cover 41 is fixed to the rear frame 6 with a hinge at the front edge part of the engine room 9, that is, at the border part between the engine room 9 and the operating fluid tank 8. The upper cover 41 is able to open and close in the horizontal direction around the hinge. The lower cover 42 is a member for covering a lower side surface part of the rear vehicle section 3*b*. The lower cover 42 is fixed to the rear frame 6 with a hinge at the end part on the upper cover 41 side, and can be opened and closed in the vertical direction around the hinge. The top plate 43 is a member for covering the upper surface of the rear vehicle section 3*b*.

As illustrated in FIG. 8, the cooling room 10 is disposed to the rear of the engine room 9, and the cooling unit 19 is accommodated inside the cooling room 10. The cooling unit 19 is a unit for reducing the temperature of liquids or gases flowing inside the cooling unit 19, and may be exemplified by a condenser or a radiator and the like. The cooling room 10 has a front plane defined by the partition wall 9*a*, side planes defined by the vehicle body cover 40, a top plane defined by the vehicle body cover 40, and a rear plane defined by a grille 44. Air inside the cooling room 10 is exhausted to the outside in the rear through an opening part of the grille 44 due to the cooling fan 11 being rotated.

As illustrated in FIG. 8, the engine room 9 accommodates the engine 18 and the exhaust gas post-processing device 20. The engine room 9 further accommodates a belt 18*a* and the like for transmitting torque from the engine 18 to auxiliary equipment. The engine 18 is disposed in a lower part of the engine room 9 and is an engine in which the crankshaft extends in the front-back direction, that is, a so-called vertical mounted engine.

Figure 9:
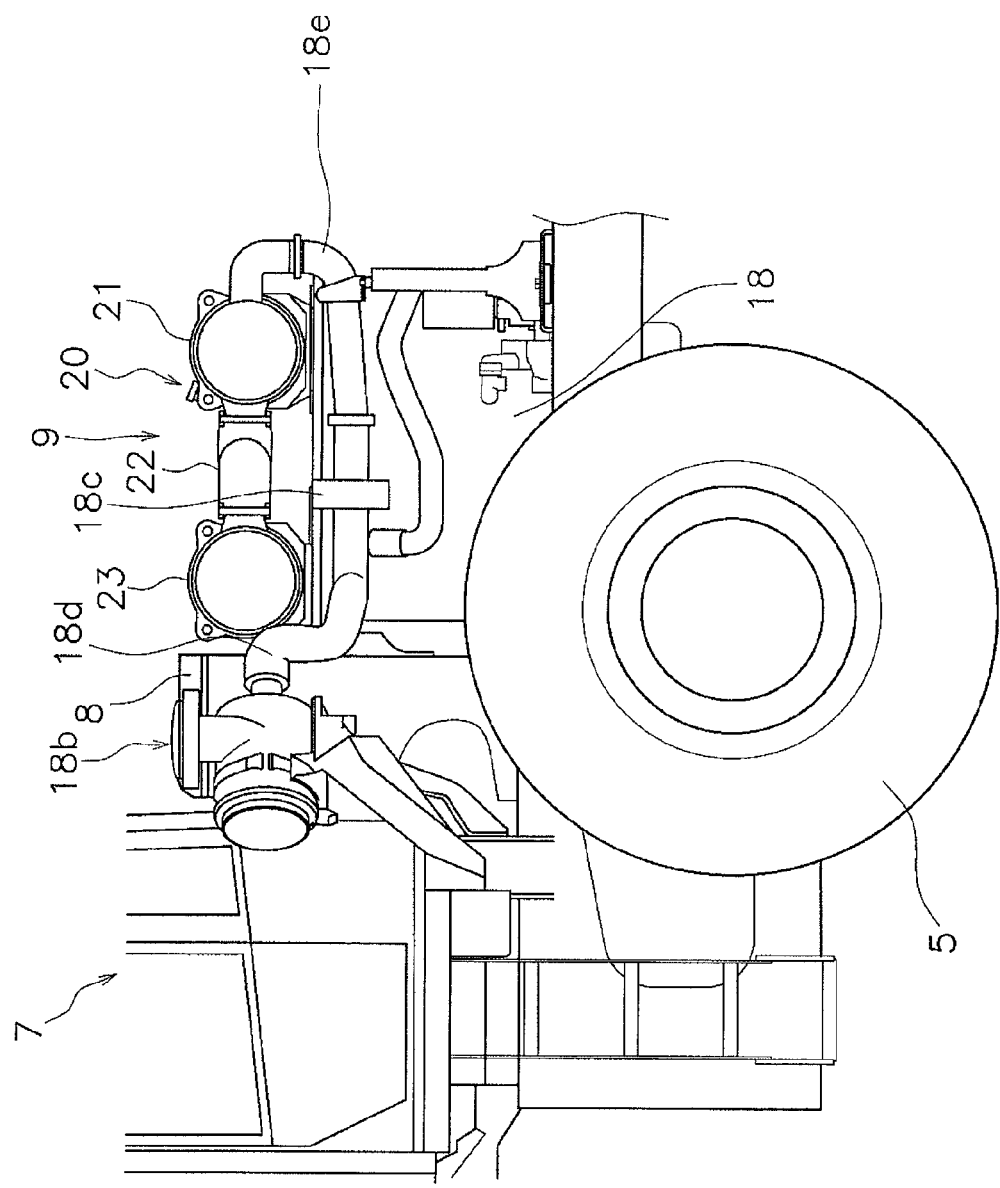
FIG. 9 is a side view of the vicinity of the engine room seen from the left side.

FIG. 9 is a side view of the vicinity of the engine room 9 seen from the left side. The description of the vehicle body cover 40 is omitted in FIG. 9 to facilitate explanation. As illustrated in FIG. 9, an air cleaner 18*b* is disposed on the left side of the operating fluid tank 8. The air cleaner 18*b* removes foreign matter from the air sent to the engine 18.

A turbo charger 18*c* is connected to the air cleaner 18*b* via a flexible intake pipe 18*d*. The turbo charger 18*c* rotates a turbine with exhaust gas from the engine 18 and compresses air from the air cleaner 18*b* and forces the air into the engine 18. The turbo charger 18*c* is disposed on the left edge part (example of the second lateral side) of the engine room. Specifically, the turbo charger 18*c* is disposed on the left side of the engine 18 inside the engine room 9.

Figure 10:
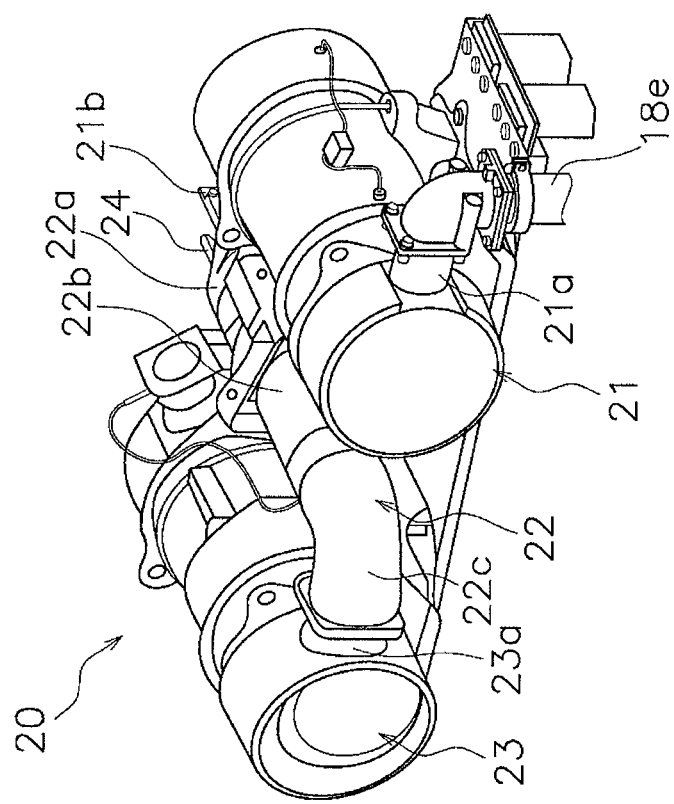
FIG. 10 is a perspective view of the exhaust gas post-processing device as seen from the left rear.

The exhaust gas post-processing device 20 accommodated in the engine room 9 is disposed in an upper part of the engine room 9. Specifically, the exhaust gas post-processing device 20 is disposed above the engine 18. FIG. 10 is a perspective view of the exhaust gas post-processing device 20 as seen from the left rear. As illustrated in FIG. 10, the exhaust gas post-processing device 20 includes, in order of the flow of the exhaust gas, a diesel particulate filtering device 21, a connecting pipe 22, and a selective catalyst reduction device 23. An injection device 24 is connected to the connecting pipe 22.

The diesel particulate filtering device 21 is connected to the engine 18 through a pipe 18*e* and is a device for treating the exhaust gas exhausted from the engine 18. Specifically, the diesel particulate filtering device 21 is a device that collects, in a filter, particulate matter such as soot in the exhaust gas emitted from the engine 18. The diesel particulate filtering device has an exhaust gas inlet 21*a* and an exhaust gas outlet 21*b*. The diesel particulate filtering device 21 sucks in exhaust gas from the engine 18 through the exhaust gas inlet 21*a*. The diesel particulate filtering device 21 exhausts the treated exhaust gas inside the diesel particulate filtering device 21 through the exhaust gas outlet 21*b*. The diesel particulate filtering device 21 burns the collected particulate matter with a heater provided with the filter.

The connecting pipe 22 connects the diesel particulate filtering device 21 and the selective catalyst reduction device 23. The entire connecting pipe 22 is formed in an S shape and includes a first bend section 22*a*, a linear section 22*b*, and a second bend section 22*c*. The first bend section 22*a* is connected to the exhaust gas outlet 21*b* of the diesel particulate filtering device 21 and the second bend section 22*c* is connected to the exhaust gas inlet 23*a* of the selective catalyst reduction device 23. The linear section 22*b* extends between the first bend section 22*a* and the second bend section 22*c*.

The injection device 24 is attached to the first bend section 22*a*. The injection device 24 is disposed on the right edge part (example of the first lateral side) inside the engine room 9. The injection device 24 injects the urea aqueous solution, which is sucked up from the urea aqueous solution tank 13 by the urea aqueous solution pump 14 and is delivered via the urea aqueous solution pipe 25, into the connecting pipe 22 in order to mix the urea aqueous solution into the exhaust gas as a reducing agent. The mixed urea aqueous solution is hydrolyzed due to the heat of the exhaust gas to become ammonia, and the ammonia is fed with the exhaust gas through the connecting pipe 22 to the selective catalyst reduction device 23.

The selective catalyst reduction device 23 purifies by reducing the nitrogen oxides in the exhaust gas using the ammonia from the injection device 24 as the reducing agent.

The diesel particulate filtering device 21, the connecting pipe 22, and the selective catalyst reduction device 23 are disposed parallel to each other. Specifically, the diesel particulate filtering device 21 and the selective catalyst reduction device 23 are both substantially cylindrical. The direction in which the center axes of the diesel particulate filtering device 21 and the selective catalyst reduction device 23 extend is the longitudinal direction of the diesel particulate filtering device 21 and the selective catalyst reduction device 23. The longitudinal direction of the devices is arranged to extend in the crosswise direction. As a result, the exhaust gas inlet 21a of the diesel particulate filtering device 21 is disposed on the left side (example of the second lateral side) inside the engine room 9. The exhaust gas outlet 21b of the diesel particulate filtering device 21 is disposed on the right side (example of the first lateral side) inside the engine room 9.

The linear section 22b of the connecting pipe 22 is also substantially cylindrical. The direction in which the center axis of the linear section 22b extends is the longitudinal direction of the connecting pipe 22. The longitudinal direction of the connecting pipe 22 is disposed so as to be aligned in the vehicle width direction.

Figure 11:
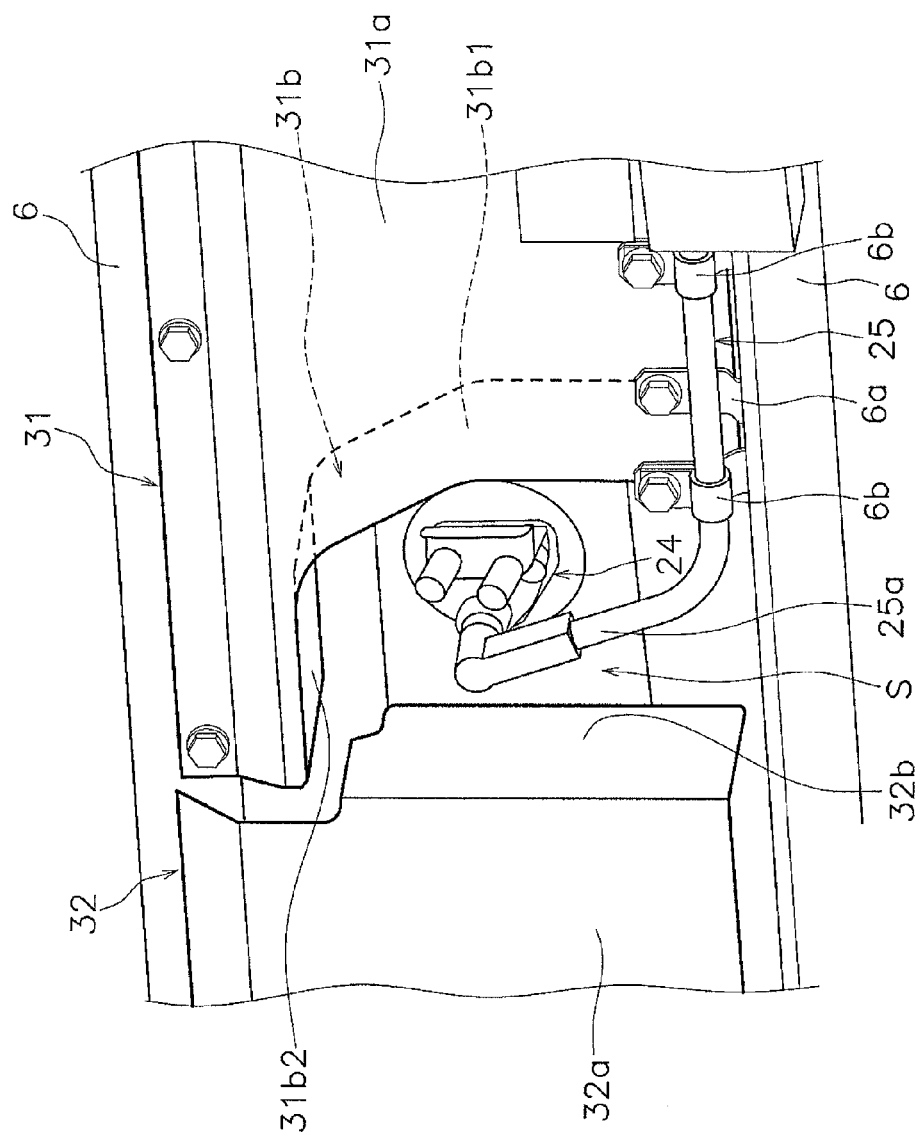
FIG. 11 is a perspective view of a detail around an injection device as seen from the right front.
Figure 12:
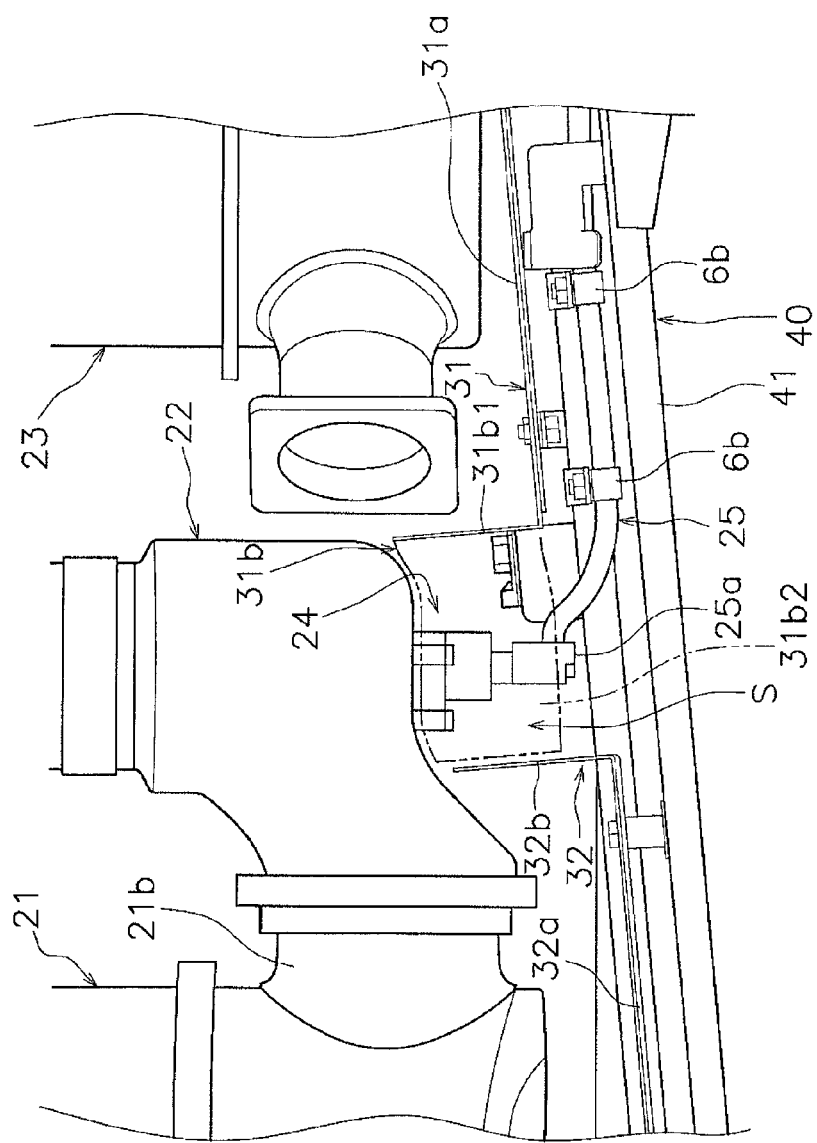
FIG. 12 is a plan view of the vicinity of the injection device.

FIG. 11 is a perspective view of the vicinity of the injection device 24 as seen from the right front, and FIG. 12 is a plan view of the vicinity of the injection device 24. As illustrated in FIGS. 11 and 12, a first partition plate 31 is disposed between the selective catalyst reduction device 23 and the vehicle body cover 40. Specifically, the first partition plate 31 is disposed between the selective catalyst reduction device 23 and the upper cover 41. A second partition plate 32 is disposed between the diesel particulate filtering device 21 and the vehicle body cover 40. Specifically, the second partition plate 32 is disposed between the diesel particulate filtering device 21 and the upper cover 41. The first partition plate 31 and the second partition plate 32 are disposed in a row in the front-back direction. The first partition plate 31 is disposed in front of the second partition plate 32. A partition plate is divided into two to constitute the first partition plate 31 and the second partition plate 32, and an interval between the first partition plate 31 and the second partition plate 32 is provided to create a gap for pipes and the like to pass through.

The first partition plate 31 has a base part (first partition part) 31a and a peripheral wall part 31b, and is attached to the rear frame 6 using the mounting bracket 6a. The first partition plate 31 has heat shielding properties and is formed, for example, by a steel plate treated with a heat resistant coating. The base part 31a of the first partition plate 31 has a plate shape that extends in the front-back direction from the front edge part of the engine room 9 to near the injection device 24, and is substantially rectangular. A rear edge part of the base part 31a is cut into a fan shape so that the right side surface of the injection device 24 is exposed when the vehicle body cover 40 is removed. Specifically, the base part 31a does not extend to the side of the injection device 24. The base part 31a is disposed between the selective catalyst reduction device 23 and the vehicle body cover 40. Further, radiant heat radiating toward the vehicle body cover 40 from the selective catalyst reduction device 23 can be blocked and consequently damage to the coating of the vehicle body cover 40 can be prevented.

The peripheral wall part 31b of the first partition plate 31 extends from the rear edge of the base part 31a toward the left side and covers the injection device 24 from the front thereof to above the injection device 24 so as to face the injection device 24. That is, the peripheral wall part 31b has a second partition part 31b1 that is a portion disposed between the injection device 24 and the selective catalyst reduction device 23, and a third partition part 31b2 that is a portion disposed between the injection device 24 and the top plate 43. The peripheral wall part 31b extends from the base part 31a to near the right side surface of the connecting pipe 22. The peripheral wall part 31b also extends substantially along the contour of the right side surface of the connecting pipe 22. As a result, the left side, the front and the top of the injection device 24 are covered by the peripheral wall part 31b and the right side surface of the connecting pipe 22.

The second partition plate 32 has heat shielding properties and is formed, for example, by a steel plate treated with a heat resistant coating. The second partition plate 32 has a base part 32a and a peripheral wall part 32b, and is fixed to the inside surface of the upper cover 41 using bolts and the like. The second partition plate 32 is also removed when the upper cover 41 is opened to facilitate maintenance of the injection device 24 and the like.

The base part 32a of the second partition plate 32 is a plate that extends in the front-back direction from near the injection device 24 to the rear edge part of the engine room 9, and has a rectangular shape. The front edge of the base part 32a is located to the rear of the injection device 24. The base part 32a is disposed between the diesel particulate filtering device 13a and the vehicle body cover 40. As a result, radiant heat radiating toward the vehicle body cover 40 from the diesel particulate filtering device 13a can be blocked and consequently damage to the coating of the vehicle body cover 40 can be prevented.

The peripheral wall part 32b of the second partition plate 32 extends from the front edge of the base part 32a toward the left side and covers the injection device 24 from the rear thereof so as to face the injection device 24. Specifically, the peripheral wall part 32b is a fourth partition part that is disposed between the injection device 24 and the diesel particulate filtering device 13a. The peripheral wall part 32b extends from the base part 32a to near the right side surface of the connecting pipe 22. As described above, the injection device 24 is disposed inside an accommodating space S defined by the peripheral wall part 31b of the first partition plate 31, the peripheral wall part 32b of the second partition plate 32, the vehicle body cover 40, and the connecting pipe 22.

Figure 13:
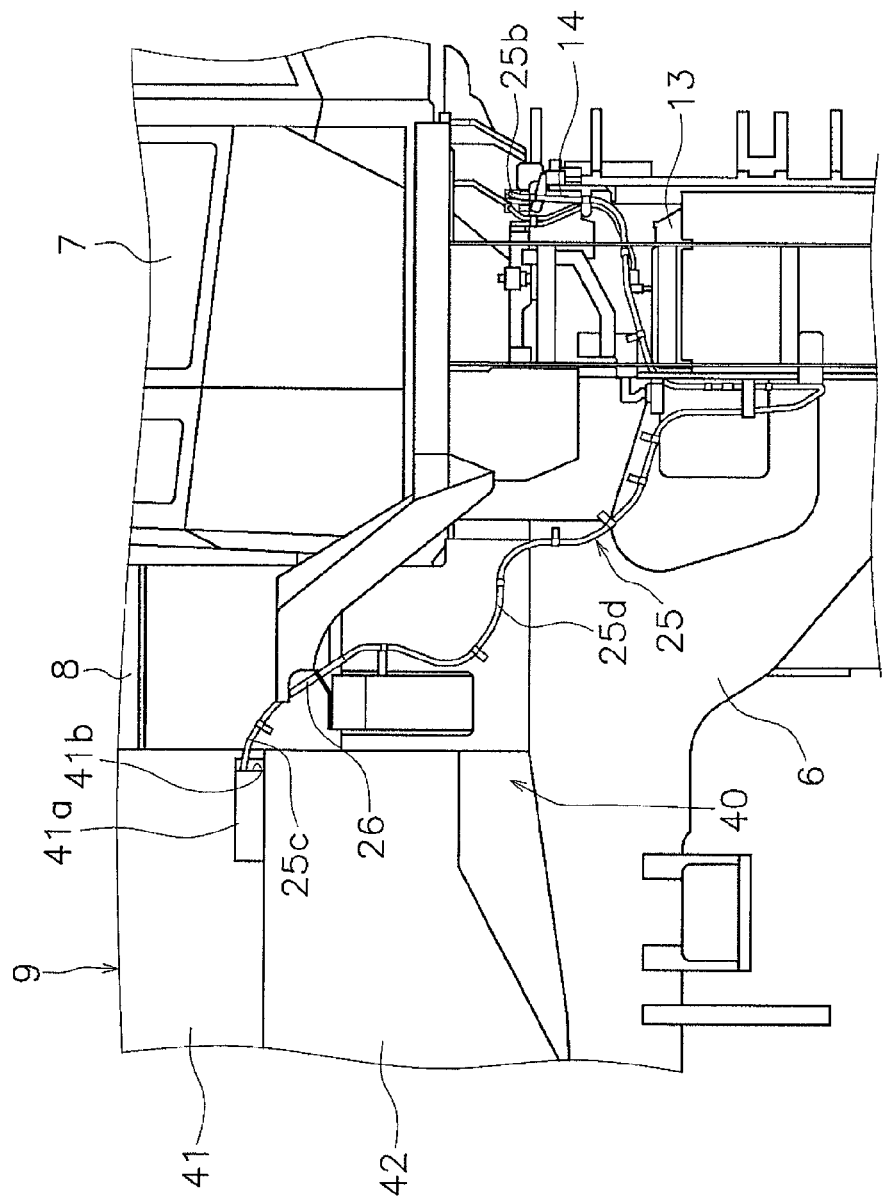
FIG. 13 is a right side view illustrating an example of disposition of a urea aqueous solution pipe.
Figure 14:
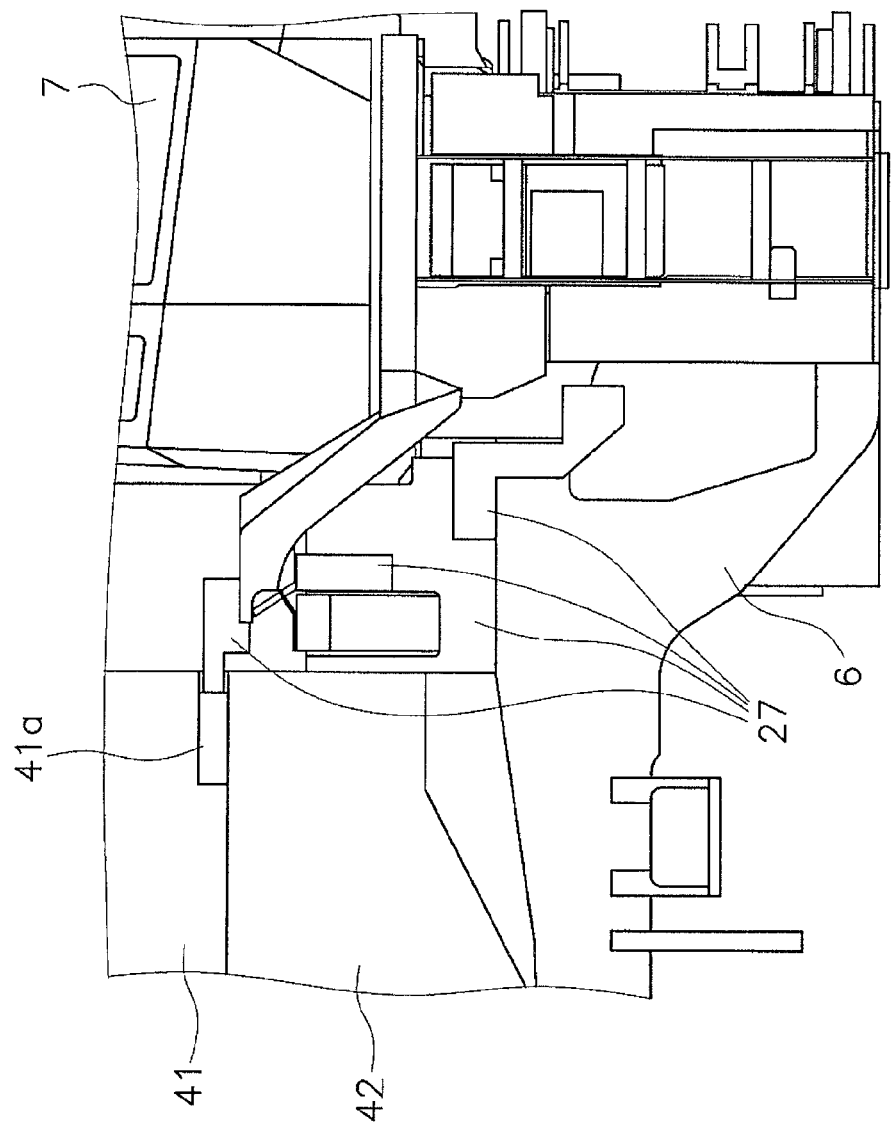
FIG. 14 is a right side view illustrating a state in which pipe covers are attached to the urea aqueous solution pipe.

FIG. 13 is a right side view illustrating an example of disposition of the urea aqueous solution pipe 25, and FIG. 14 is a right side view illustrating a state in which pipe covers are attached to the urea aqueous solution pipe 25. As illustrated in FIG. 13, the urea aqueous solution pipe 25 is connected to the injection device 24 at a first end part 25a (see FIGS. 11 and 12), and connected to the urea aqueous solution pump 14 at a second end part 25b. The urea aqueous solution pipe 25 is a pipe for supplying urea aqueous solution that is sucked up from the urea aqueous solution tank 13 by the urea aqueous solution pump 14, to the injection device 24.

The urea aqueous solution pipe 25 extends downward from the urea aqueous solution pump 14 to near the urea aqueous solution tank 13, extends in the horizontal direction above the urea aqueous solution tank 13, and drops downward once behind the urea aqueous solution tank 13. The urea aqueous solution pipe 25 extends upward along the outside surfaces of the rear frame 6 and the vehicle body cover 40, and is drawn in from the front edge of the upper cover 41 of the vehicle body cover 40 into the engine room 9. Specifically, the upper cover 41 has a bulging part 41a that bulges to the outside at the front edge part of the upper cover 41. The bulging part 41a extends in the front-back direction and has a pipe installation port 41b for drawing the urea aqueous solution pipe 25 into the engine room 9. The size of the pipe installation port 41b is designed so that the upper cover 41 does not interfere with the urea aqueous solution pipe 25 when the upper cover 41 is opened. As illustrated in FIG. 14, the urea aqueous solution pipe 25 is protected by a plurality of pipe covers 27 so that the urea aqueous solution pipe 25 is not exposed to the outside during normal operation.

As illustrated in FIGS. 11 and 12, the urea aqueous solution pipe 25 extends between the base part 31a of the first partition plate 31 and the vehicle body cover 40 inside the engine room 9. Consequently, radiant heat radiating from the selective catalyst reduction device 23 toward the urea aqueous solution pipe 25 can be blocked and consequently the urea aqueous solution flowing inside the urea aqueous solution pipe 25 can be prevented from being heated and changing into ammonia. Further, the peripheral wall part 31b of the first partition plate 31 is disposed between the first end part 25a of the urea aqueous solution pipe 25 and the selective catalyst reduction device 23. Thus, radiant heat radiating from the selective catalyst reduction device 23 toward the urea aqueous solution pipe 25 can also be blocked by the peripheral wall part 31b.

The urea aqueous solution pipe 25 is supported by a plurality of mounting brackets 6b inside the engine room 9. The urea aqueous solution pipe 25 is supported by the mounting brackets 6b so as to maintain a certain distance from the first partition plate 31. The mounting brackets 6b extend upward from the rear frame 6 and are slanted in a direction away from the first partition plate 31. The mounting brackets 6b are disposed a certain distance away from each other in the front-back direction.

As illustrated in FIG. 13, a relay member 26 is disposed on the right side of the operating fluid tank 8. The relay member 26 is a member for interconnecting pipes. The urea aqueous solution pipe 25 connecting the injection device 24 and the urea aqueous solution pump 14 is configured as two pipes made up a first pipe 25c and a second pipe 25d. The first pipe 25c and the second pipe 25d are connected to each other to allow for fluid communication by the relay member 26. The first pipe 25c connects the relay member 26 and the injection device 24. The second pipe 25d connects the relay member 26 and the urea aqueous solution pump 14.

The first and second pipes 25c, 25d have heating wires so that the urea aqueous solution flowing therein does not freeze. The heating wire of the first pipe 25c and the heating wire of the second pipe 25d are controlled independently of each other. Specifically, only the heating wire of the first pipe 25c may be heated, or only the heating wire of the second pipe 25d may be heated, or both of the heating wires may be heated.

Characteristics

The wheel loader 1 according to the present embodiment has the following characteristics.

Since the urea aqueous solution tank 13 is disposed behind the ladder 12, the operator is able to easily access the urea aqueous solution tank 13 from the ground. Further, the wheel loader 1 includes a front vehicle section 3a and a rear vehicle section 3b that are connected to each other in the horizontal direction in a manner that allows swinging, and front wheels 4 are located in front of the ladder 12. As a result, when the front vehicle section 3a is swung to the left with respect to the rear vehicle section 3b, that is, swung in the direction opposite the side on which the urea aqueous solution tank 13 is disposed, a work space is formed between the ladder 12 and the front wheels 4. As a result, work such as replenishing the urea aqueous solution in the urea aqueous solution tank 13 disposed behind the ladder 12 may be performed easily.

(2) Since the injection device 24 and the urea aqueous solution tank 13 are both disposed on the right side of the wheel loader 1, the length of the urea aqueous solution pipe 25 connecting the injection device 24 and the urea aqueous solution tank 13 may be reduced.

(3) The exhaust gas outlet 21b of the diesel particulate filtering device 21 and the injection device 24 are both disposed on the right side of the wheel loader 1. As a result, the injection device 24 is able to mix the urea aqueous solution into the exhaust gas by effectively using the length of the connecting pipe 22.

(4) Since the turbo charger 18c and the exhaust gas inlet 21a of the diesel particulate filtering device 21 are both disposed on the left side of the wheel loader 1, the length of the pipe 18e connecting the turbo charger 18c and the diesel particulate filtering device 21 may be reduced.

(5) Since the replenishment inlet 13b of the urea aqueous solution tank 13 faces forward, the space between the ladder 12 and the front wheel 4 may be used so that work on the urea aqueous solution tank 13 such as replenishing the urea aqueous solution in the urea aqueous solution tank 13 may be performed.

(6) Since the retaining member 16 that retains the urea aqueous solution tank 13 is supported by the supporting frame 17 in a manner that allows sliding forward, the urea aqueous solution tank 13 may be easily pulled forward.

(7) Since the side surfaces and the back surface of the urea aqueous solution tank 13 are supported by the back plate 16b and the pair of side plates 16c of the retaining member 16, the retaining member 16 is able to retain the urea aqueous solution tank 13 in a stable manner.

(8) The urea aqueous solution tank 13 can be prevented from accidentally jumping upwards out of the retaining member 16 due to the first regulating bar 16d. The urea aqueous solution tank 13 can be prevented from accidentally jumping forward out of the retaining member 16 due to the second regulating bar 16e.

MODIFIED EXAMPLES

While an embodiment of the present invention has been described above, the present invention is not limited to the embodiment and many variations and modifications can be made within the spirit of the present invention.

Modified Example 1

While the urea aqueous solution tank 13 is disposed behind the ladder 12 that extends downward from the right side of the cab 7 in the above embodiment, the disposition is not limited to the right side and the urea aqueous solution tank 13 may be disposed behind a ladder that extends downward from the left side of the cab 7.

Modified Example 2

While the urea aqueous solution tank 13 is supported by the supporting frame 17 via the retaining member 16 in the above embodiment, the configuration is not limited as such and the urea aqueous solution tank 13 may be supported directly by the supporting frame 17 while omitting the retaining member 16.

Modified Example 3

While urea aqueous solution is used as the reducing agent in the above embodiment, the configuration is not limited as such and another reducing agent may be used.

What is claimed is:

1. A wheel loader comprising:
   an engine;
   a selective catalyst reduction device configured to treat exhaust gas from the engine;
   a cab provided with a driver seat therein;
   a ladder configured for ascending to and descending from the cab and provided on a lateral side of the cab;
   a reducing agent tank disposed laterally inward of the ladder in a vehicle width direction of the wheel loader such that the ladder overlaps the reducing agent tank in a lateral side view of the wheel loader, the reducing agent tank being configured to store a reducing agent; and
   an injection device configured to inject the reducing agent from the reducing agent tank into exhaust gas fed from the engine toward the selective catalyst reduction device.

2. The wheel loader according to claim 1, wherein
   the injection device is disposed on a first lateral side of the wheel loader in a rear view, and
   the reducing agent tank is disposed behind the ladder provided on the first lateral side of the cab.

3. A wheel loader comprising:
   an engine;
   a selective catalyst reduction device configured to treat exhaust gas from the engine;
   a cab provided with a driver seat therein;
   a ladder configured for ascending to and descending from the cab, the ladder being provided on a first lateral side of the cab in a rear view of the wheel loader;
   a reducing agent tank disposed behind the ladder on the first lateral side of the cab, the reducing agent tank being configured to store a reducing agent;
   an injection device configured to inject the reducing agent from the reducing agent tank into exhaust gas fed from the engine toward the selective catalyst reduction device, the injection device being disposed on a first lateral side of the wheel loader;
   a diesel particulate filtering device; and
   a connecting pipe connecting the diesel particulate filtering device and the selective catalyst reduction device,
   the diesel particulate filtering device, the selective catalyst reduction device, and the connecting pipe being disposed with the longitudinal directions thereof aligned in the vehicle width direction.

4. The wheel loader according to claim 3, wherein
   the diesel particulate filtering device has an exhaust gas inlet for introducing the exhaust gas from the engine, and an exhaust gas outlet for delivering the exhaust toward the selective catalyst reduction device, the exhaust gas inlet is located on a second lateral side opposite the first lateral side in the rear view, and
   the exhaust gas outlet is located on the first lateral side.

5. The wheel loader according to claim 4, further comprising:
   a turbo charger disposed on the second lateral side.

6. The wheel loader according to claim 1, wherein
   the reducing agent tank has a replenishment inlet for replenishing the reducing agent, and
   the replenishment inlet is provided facing the front.

7. The wheel loader according to claim 1, further comprising:
   a retaining member configured to retain the reducing agent tank; and
   a supporting frame disposed behind the ladder, and configured to support the retaining member in a manner that allows sliding forward.

8. The wheel loader according to claim 7, wherein
   the retaining member has a bottom plate, a back plate that extends upward from the rear edge of the bottom plate, and a pair of side plates that extend upward from both side edges of the bottom plate, and
   the reducing agent tank is accommodated in a space defined by the bottom plate, the back plate, and the pair of side plates.

9. The wheel loader according to claim 8, wherein
   the retaining member has a regulating member configured and arranged to regulate movement of the reducing agent tank forward and upward.

10. The wheel loader according to claim 9, wherein
    the reducing agent is a urea aqueous solution.

11. The wheel loader according to claim 1, further comprising:
    a supporting frame disposed laterally inward of the ladder in the vehicle width direction, the supporting frame being configured to support the reducing agent tank such that a replenishment inlet of the reducing agent tank faces in a vehicle frontward direction.

12. The wheel loader according to claim 11, wherein
    the supporting frame is at least partially open on a vehicle frontward side of the supporting frame to allow access to the replenishment inlet.

13. The wheel loader according to claim 11, further comprising
    a front vehicle section and a rear vehicle section pivotally coupled together such that the front vehicle section is horizontally swingable leftward or rightward with respect to the rear vehicle section, the rear vehicle section including a rear frame,
    the rear frame being disposed under a lower edge part of the cab and extending rearward beyond the cab in a vehicle rearward direction,
    the supporting frame being attached to the rear frame and disposed between the ladder and the rear frame.

* * * * *